B. M. W. HANSON.
WORK HOLDER.
APPLICATION FILED DEC. 9, 1920.
1,415,342.
Patented May 9, 1922.
2 SHEETS—SHEET 1.
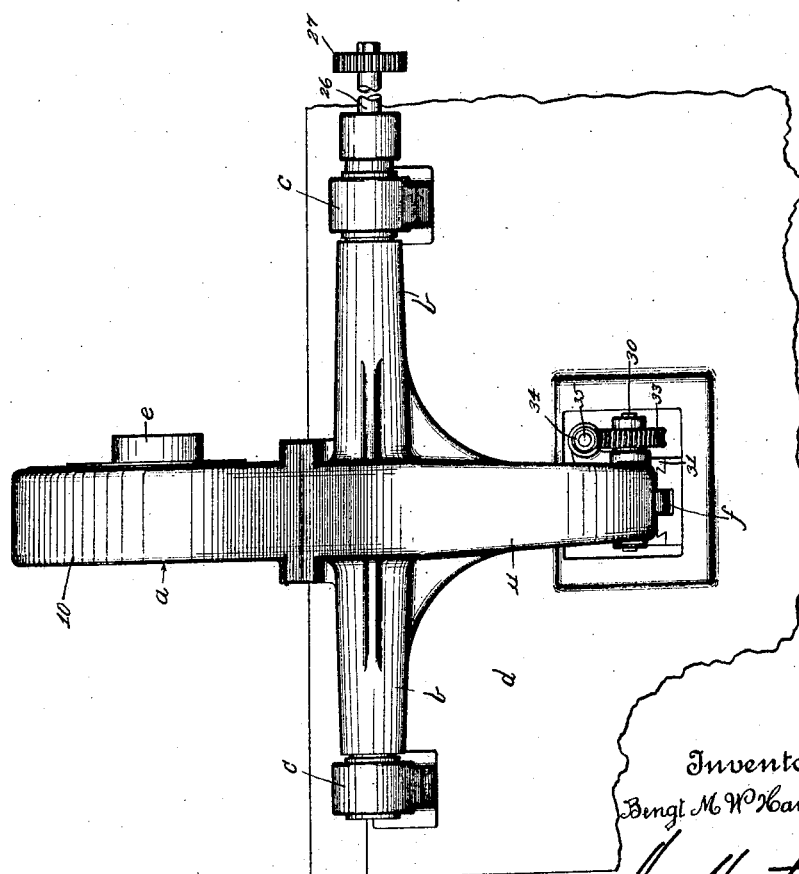
Inventor
Bengt M. W. Hanson
By
His Attorney

UNITED STATES PATENT OFFICE.

BENGT M. W. HANSON, OF HARTFORD, CONNECTICUT.

WORK HOLDER.

1,415,342.  Specification of Letters Patent.  Patented May 9, 1922.

Original application filed April 28, 1920, Serial No. 377,267. Divided and this application filed December 9, 1920. Serial No. 429,353.

*To all whom it may concern:*

Be it known that I, BENGT M. W. HANSON, a citizen of the United States, and a resident of Hartford, in the county of Hartford, State of Connecticut, have invented certain new and useful Improvements in Work Holders, of which the following is a specification.

This application is a divisional application of application Serial No. 377,267 filed April 28, 1920, for metal working machine.

The present invention relates more particularly to a device for supporting the work, and has as its object to provide a device of this sort having features of novelty and advantage. As an instance of a use to which the device of the present invention may be placed, reference may be had to said original application wherein is disclosed a metal working machine adapted for operation on curved surfaces, for instance for grinding the holes of bushings and the like. As pointed out in said original application, the disclosure is by way of illustration only and is not to be taken as restrictive, for the features of construction are susceptible of various uses.

In the accompanying drawing:

Fig. 1 is a front view of the work supporting device of the present invention.

Fig. 2 is a side view thereof with a portion of the head of the support broken away.

Figure 3:
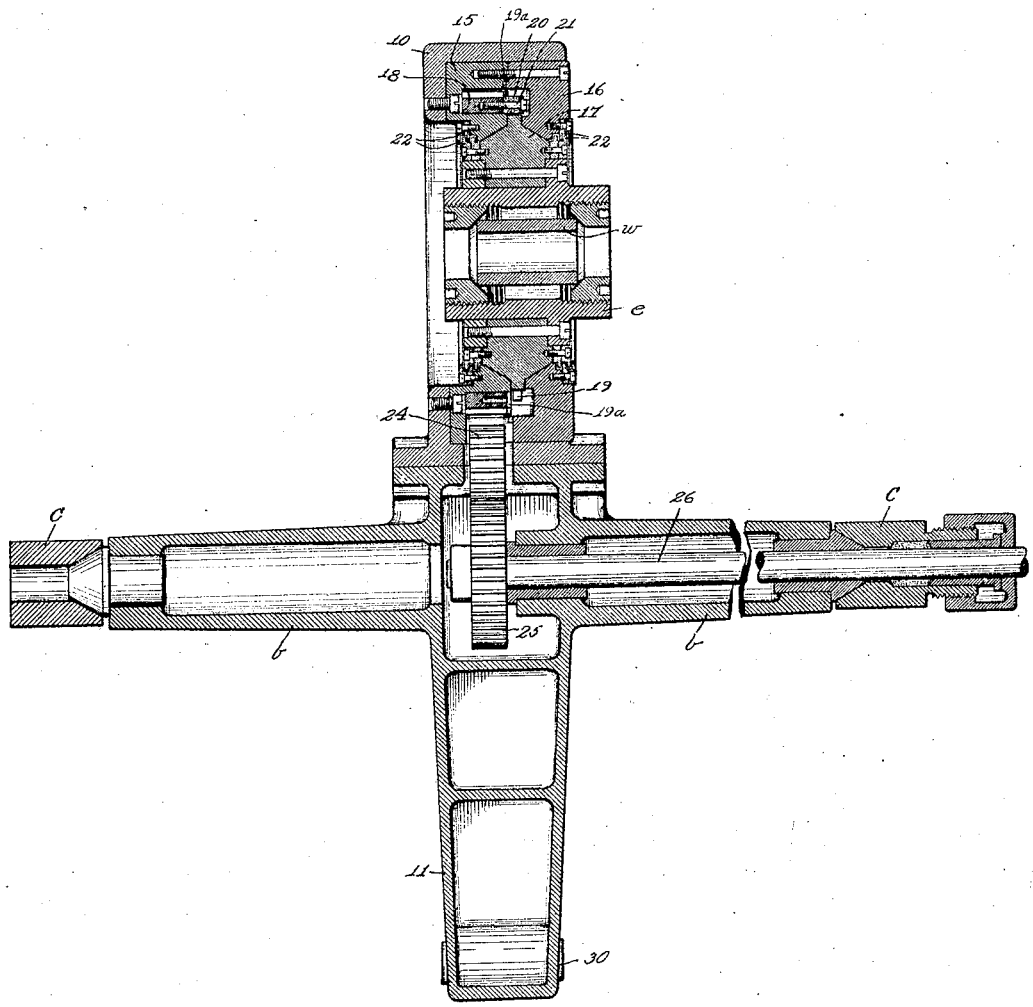
Fig. 3 is a vertical sectional view taken longitudinally through the device on line 3—3 of Fig. 2.

Referring to the drawings, $a$ denotes generally a work support having laterally extending hollow trunnions $b$, the outer ends of which are supported in bearings $c$ carried by a base or pedestal $d$. The upper end of the work support is in the form of a circular head 10 in which is rotarily mounted a work holder such as a chuck $e$. The work holder has a depending leg 11 carrying a roller 12 with which cooperates a cam $f$ for swinging the work support in its bearings to feed the work relative to the tool. This tool is not shown in the present instance but may be in the form of a grinding wheel carried by suitable tool stocks supported on a carriage which slides on the top of the pedestal $d$, all of which is clearly shown in my aforesaid application.

In the circular head 10 of the work support is fixed a pair of complementary bearing rings 15, 16 between which is supported a rotary ring 17 carrying the chuck $e$ which may be of any suitable construction. In the present instance, the work carried by this chuck is in the form of a bushing $w$. It will be noted that the opposed bearing surfaces of the rings 15, 16 are inclined towards one another, this being of advantage in that a relatively large bearing surface is provided for the ring 17 without increasing the width of the head of the support. 18 designates a ring-like gear encircling and having a bearing on the bearing ring 15. This gear is yieldingly or flexibly connected to the ring 17 so that the latter will rotate smoothly and regularly free from any disturbances resulting from the driving mechanism therefor, and to this end the periphery of the ring 17 is interrupted by notches 19 and in the side of the gear 18 are recesses 19$^a$ and these notches and recesses receive small blocks 20 of a yielding material such as leather. Each of these blocks is secured to the gear 18 in any suitable manner as by screws 21. In Fig. 3, for illustrative purposes, the block 20 is omitted from the notch in the lower part of the ring 17. The associated rings 22 form oil and dust guards which may be of any suitable construction.

The ring-like gear 18 is driven through intermediate gears 24 and a gear 25, the latter being fixed on the inner end of a shaft 26 passing axially through one of the trunnions $b$ and its bearing $c$. This shaft may be driven by a gear 27 connected up to a speed change mechanism.

The work support $a$ may be swung in any suitable manner on its trunnions to feed the work relative to the tool. This result is brought about in the present illustrative disclosure by the spiral cam $f$ cooperating with the roller 12. This cam may be mounted on a shaft 30 journalled in a slide 31 which may be adjusted by a screw 32. Also fixed on the shaft 30 is a worm gear 33 with which meshes a worm 34 carried by shaft 35. This shaft may be driven or controlled in any suitable manner to rotate the cam at the proper speed and thus effect the correct relative movement between the work and the operating tool.

I claim as my invention:—

1. In a device of the character described, a work support having a head and laterally extending trunnions, bearing rings mounted in said head, a rotatable member supported by said rings, a ring gear connected to said member and having a bearing about one of said bearing rings, bearings for said trunnions, a shaft extending axially through one of said trunnions and the bearing therefor, and a gear on the inner end of said shaft through which said ring gear is driven.

2. In a device of the character described, a work support, bearings in which said support is mounted, a rotatable work holder in said support, driving means therefor, and means for yieldingly connecting said holder to said driving means.

3. In a device of the character described, a work support, bearings in which said support is pivoted, a rotatable work holder in said support, driving means therefor, means for yieldingly connecting said holder to said driving means, and means for swinging said support in its bearings.

4. In a device of the character described, a work support, a rotatable ring therein, a gear, means for yieldingly connecting said gear to said ring, and means for driving said gear.

5. In a device of the character described, a work support, bearing rings therein, a rotatable member supported thereby, a driven gear having a bearing about one of said bearing rings, and means for yieldingly connecting said gears to said rotatable member.

6. In a device of the character described, a bearing, a ring rotatably mounted therein and having notches in its periphery, a driven member, yieldable members in said notches, and means for connecting said yieldable members to said driven member.

7. In a device of the character described, a head, a pair of bearing rings therein having their opposed surfaces oppositely inclined to form a V-shaped annular groove, and a rotatable ring having a periphery of like section fitting within said groove.

BENGT M. W. HANSON.